(12) United States Patent
Menzel et al.

(10) Patent No.: US 11,184,919 B2
(45) Date of Patent: Nov. 23, 2021

(54) COMMUNICATION DEVICE AND METHODS FOR SYNCHRONIZING COMMUNICATION CHANNELS AND USING THE DEVICE

(71) Applicants: Continental Teves AG & Co. oHG, Frankfurt am Main (DE); Continental Automotive GmbH, Hannover (DE)

(72) Inventors: Marc Menzel, Weimar (DE); Ulrich Stählin, Rochester, MI (US)

(73) Assignees: CONTINENTAL TEVES AG & CO. OHG, Frankfurt am Main (DE); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/525,874

(22) Filed: Jul. 30, 2019

(65) Prior Publication Data

US 2021/0037565 A1 Feb. 4, 2021

(51) Int. Cl.
| | |
|---|---|
| *H04W 4/40* | (2018.01) |
| *H04W 74/00* | (2009.01) |
| *H04W 4/90* | (2018.01) |
| *H04L 29/06* | (2006.01) |
| *H04W 80/02* | (2009.01) |

(52) U.S. Cl.
CPC .......... *H04W 74/002* (2013.01); *H04L 69/14* (2013.01); *H04W 4/40* (2018.02); *H04W 4/90* (2018.02); *H04W 80/02* (2013.01)

(58) Field of Classification Search
CPC .......... H04W 4/40; H04W 4/46; H04W 4/90; H04W 16/14; H04W 56/0015; H04W 74/002; H04W 74/0816; H04W 80/02

USPC ......... 370/328, 329, 336, 252, 350; 375/260
See application file for complete search history.

(56) References Cited

U.S. PATENT DOCUMENTS

| | | | |
|---|---|---|---|
| 2017/0195982 A1* | 7/2017 | Park ................. | H04W 56/0015 |
| 2018/0139782 A1* | 5/2018 | Sadek .............. | H04W 74/0816 |
| 2018/0288589 A1* | 10/2018 | Punithan ............... | H04W 4/46 |
| 2018/0332564 A1* | 11/2018 | Lee ........................ | H04W 4/40 |

FOREIGN PATENT DOCUMENTS

| | | | |
|---|---|---|---|
| EP | 3471477 A1 | | 4/2019 |
| WO | WO2019/050065 | * | 3/2019 |

OTHER PUBLICATIONS

Machine translation of WO2019/0500065.*

(Continued)

*Primary Examiner* — Harun Chowdhury
(74) *Attorney, Agent, or Firm* — RatnerPrestia

(57) ABSTRACT

A communication apparatus for vehicle-to-X communication (V2X communication), including a first interface for V2X communication on a first communication channel, a second interface for V2X communication on a second communication channel and a computing device for processing V2X messages received and/or to be sent. The apparatus is configured, initiated by the transmission of a first V2X message by the first interface, to transmit a second V2X message by the second interface. A corresponding method as well as the use of the communication apparatus in a vehicle or a mobile apparatus is also provided.

12 Claims, 2 Drawing Sheets

(56) References Cited

OTHER PUBLICATIONS

Intel Corporation: "Sidelink Carrier Aggregation for Mode-4 LTE V2V Communication", Oct. 9-13, 2017, Prague, Czech Republic, XP051351845, Downloaded from Internet: http://www.3gpp.org/ftp/tsg_ran/WG1_RL1/TSGR1_90b/Docs/ [retrieved Sep. 30, 2017], 8 pages.

Anonymous: "Dedicated Short Range Communication", Wikipedia, May 16, 2019, XP055736403, downloaded from Internet: https://de.wikipedia.org/w/index.php?title;=Dedicated_Short_Range_Communication&oldid=188633108 [retrieved Oct. 5, 2020], 2 pages.

Anonymous: "Diversity-Techniques", Wikipedia, Mar. 5, 2019, XP055736877, Downloaded from Internet: https://de.wikipedia.org/w/index/php?title=Diversity-Technik&oldid=186294233 [retrieved Oct. 6, 2020], 3 pages.

Invitation to Pay Additional Fees with Search Report, for International Application No. PCT/EP2020/070745, dated Oct. 19, 2020, 27 pages.

\* cited by examiner

COMMUNICATION DEVICE AND METHODS FOR SYNCHRONIZING COMMUNICATION CHANNELS AND USING THE DEVICE

FIELD OF THE INVENTION

The present invention relates to a communication apparatus for vehicle-to-X communication and a method for synchronizing communication channels of a communication apparatus for vehicle-to-X communication and the use of the apparatus.

BACKGROUND OF THE INVENTION

At present, the relevant standards of vehicle-to-X (V2X) communication are, for example, IEEE802.11(p), IEEE1609, SAE 2735, SAE 2945 and ETSI ITS-G5, all incorporated herein by reference. In addition, new standards are being compiled by 3GPP for C-V2X or respectively LTE-V2X or respectively 5G V2X. Technologies in order to be able to use ITS-G5 and LTE-V2X and 5G V2X in the same band are currently being drawn up by ETSI.

If a transmitter sends on a V2X channel, it cannot receive on any of the existing V2X channels at the same time. An unsynchronized sending via multiple channels can consequently result in a failure to possibly receive V2X messages over a comparatively long period of time.

SUMMARY OF THE INVENTION

An aspect of the invention is to provide a means which implements an efficient utilization of a plurality of V2X channels and reduces periods of time where it is not possible to receive V2X messages.

An aspect of the invention describes a communication apparatus for vehicle-to-X communication (V2X communication), comprising a first interface for V2X communication on a first communication channel, a second interface for V2X communication on a second communication channel and a computing device for processing, in particular by means of the first and the second interface, V2X messages received and/or to be sent, wherein the communication apparatus is configured, initiated by the transmission of a first V2X message by means of the first interface, to transmit a second V2X message by means of the second interface.

According to the specifications regarding ITS-G5/DSRC V2X, the respective frequency bands comprise a plurality of communication channels. By way of example, in accordance with ETSI TS 102 724 V1.1.1 (2012-10), the ITS G5A band (5,875 GHz to 5,905 GHz) has the so-called control channel (CCH), the so-called service channel 1 (SCH1) and the so-called service channel 2 (SCH2). Furthermore, the specifications regarding ITS-G5/DSRC currently require that relevant communication apparatuses can send and receive at least on the control channel (ITS-G5) or respectively on the safety channel (DSRC).

The concept which forms the basis of an aspect of the invention is to now use one of the communication channels, but in particular the control channel or respectively safety channel, as the basis for the synchronization of at least one further communication channel and/or all of the, if applicable, existing further communication channels. Accordingly, V2X messages can therefore be substantially simultaneously transmitted via the first and the second communication channel and, if applicable, further channels. As a result, a synchronization of the sending of V2X messages of all of the or respectively multiple V2X communication channels can be achieved with the vehicle-to-X communication. Consequently, the first communication channel serves, in addition to transmitting relevant V2X messages to be transmitted, as a synchronization channel for at least one further communication channel of the communication apparatus. The further channel(s) would consequently, as a result of a message being transmitted on the first channel, likewise transmit messages to be transmitted if applicable. This removes the necessity for a comparatively costly synchronization by means of an, if applicable, external synchronization source. As a result, the efficient utilization of multiple communication channels can be increased. In addition, a synchronization of multiple communication channels is made possible, without additional requirements being placed on the accuracy of the absolute time synchronization which is frequently realized via a global satellite navigation system. The first communication channel and the second communication channel are comprised, for example, by the same frequency band. Expediently, in order to send and receive V2X messages, the communication apparatus has an antenna designed for this purpose.

It should be understood that further communication channels for V2X communication can be provided in the frequency band for V2X communication, and the communication apparatus is, in these cases, also configured for V2X communication via said further communication channels. Accordingly, it can be provided that the apparatus is configured to execute the described procedure on all communication channels and/or a part of the communication channels of a frequency band. One of the channels serves, as described, as a synchronization for the further channels. In particular, if merely a part of the communication channels of a frequency band is enlisted, it is possible to attain a more efficient usage of the bandwidth of the first communication channel, if applicable. By way of example, particularly long and/or particularly frequently dispatched messages can be dispatched by the channels which are not synchronized by means of the first communication channel, independently of the synchronization.

In principle, the communication apparatus can also be configured for V2X communication via further frequency bands which likewise have a plurality of communication channels, if applicable.

In accordance with an embodiment, the apparatus is formed to determine the time of the transmission of the first V2X message via the first communication channel using a method or respectively log for media access control. By means of the method or respectively log for media access control, a check is in particular effected to establish whether the relevant communication channel is free for the transmission of a V2X message. If it is established within the framework of the check that the first communication channel is free, the first V2X message is transmitted by means of the first interface on the first communication channel. Since the transmission of a message by means of the second interface on the second channel is triggered by means of a transmission via the first channel, it is not envisaged, in accordance with an embodiment of an aspect of the invention, that a media access control method be executed regarding the start time of the transmission of messages by means of the second interface. In other words, the media access control method regarding the further communication channels triggered by the transmission of a message by means of the first interface is, in particular, merely executed regarding the first communication channel, according to an aspect of the invention.

Furthermore, the execution of a media access control method can accordingly be provided for further communication channels which are not triggered by the transmission of a message by means of the first interface.

Exemplary media access control (MAC) methods are methods based on CSMA (Carrier Sense Multiple Access), such as CSMA/CA, CSMA/CD and CSMA/CR. The basic rule is that, without any synchronization, the messages would be sent on the different channels at different times since, due to the media access control, a random waiting time precedes each sending operation in each case and the sideband broadcast of a transmission operation on a channel would in each case be interpreted on the other channels as information that these are already occupied by a sending by another communication apparatus.

In accordance with an embodiment, the communication apparatus is configured to store messages to be dispatched in at least one data memory of at least one transceiver comprised by the communication apparatus. Expediently, the transceiver is formed by means of an integrated circuit ("radio chipset"). Consequently, the apparatus is configured to store the first V2X message and the second V2X message prior to transmission in the data memory of the transceiver.

In accordance with an embodiment, the communication apparatus is configured to store the first V2X message and the second V2X message prior to transmission in a so-called queue, assigned in each case to the respective first interface and second interface. This advantageously makes possible a simultaneous dispatch of the messages on all communication channels. The queues are expediently stored by means of the data memory of the transceiver.

In accordance with an embodiment, the apparatus is configured to sign V2X messages to be transmitted, in particular the first V2X message and the second V2X message, prior to being stored in the respective queue. Accordingly, V2X messages to be transmitted are signed prior to being stored in the data memory of the transceiver or respectively of the respective queue. Compared with signing immediately prior to transmission, this results in the advantage that no time delay occurs due to the performance limitation of a signing unit carrying out the signing during the sending of the individual messages.

In accordance with an embodiment, the apparatus is designed to design the first V2X message to be the same length as or longer than the second V2X message. According to a further development, it can accordingly be provided that the apparatus is configured to prolong the time of the first V2X message and/or to divide the second V2X message in order to reduce the temporal transmission length compared with the first V2X message on multiple communication channels, if existing, except for the first communication channel, in such a way that it is possible to send again on all of the channels as soon as the first communication channel is no longer occupied. As a result, it can advantageously be avoided that, if a media access control method is merely executed on the first channel, a further communication apparatus in the receiving range of the communication apparatus recognizes, on the basis of the result of a media access control method on the first channel, that the first communication channel is free and e.g. starts a transmission on the second channel, although a message transmission by the communication apparatus is still active on this. In principle, it can also be provided, within the framework of an aspect of the invention, that the problem is circumvented by performing a check of the media access control on the second or respectively the further channels simultaneously. However, this does not come under the particularly advantageous embodiments of an aspect of the invention since, in comparison, a higher implementation outlay and/or a greater susceptibility to errors is seen.

In accordance with an embodiment, the apparatus is configured to transmit a blank message by means of the first interface via the first communication channel after a predefined period of time. In particular, the term "blank message" means a message without significant relevant information content. The predefined period of time is in particular defined by a predefined maximum age, for example since the message was stored in the data memory of the transceiver, of a message to be transmitted via the second communication channel. One of the resulting advantages is that this does not produce any intolerable latencies in the V2X communication, since it can be ensured that, irrespective of whether a message comprising relevant information is to be transmitted by means of the first interface, a transmission of a further message by means of the second interface triggered by the transmission of a message by means of the first interface is effected, taking into account the maximum tolerable age of the further message.

In accordance with an embodiment, the communication apparatus is configured to design at least two channel groups, each having a plurality of communication channels, wherein V2X messages to be transmitted of similar length and of similar frequency are assigned to the same channel group. Each channel group has at least two communication channels within the meaning of the first communication channel and the second communication channel or respectively two interfaces within the meaning of the first interface and second interface, in the sense that each channel group can be substantially synchronized independently of each other by means of, in each case, a first interface comprised by the relevant channel group. Each of the channel groups can consequently be designed, according to the further development, as described for the respective embodiments of aspects of the invention. As a result, a further optimization of the bandwidth usage can be realized, for example because unnecessary waiting times can be avoided during the transmission of messages and, consequently, latencies can be further reduced.

In accordance with an embodiment of the communication apparatus, the first communication channel is designed according to ITS-G5 as the specified control channel in this respect and/or according to DSRC as the specified safety channel in this respect.

The vehicle can be a motor vehicle, in particular a car, a truck, a motor cycle, an electric vehicle or a hybrid vehicle, a water craft or an aircraft.

Furthermore, an aspect of the invention relates to a method for synchronizing communication channels of a vehicle-to-X communication apparatus, comprising the steps of:

transmitting a first V2X message by means of a first interface on a first communication channel, transmitting a second V2X message by means of a second interface on a second communication channel, wherein the transmission of the second V2X message by means of the second interface is initiated by the transmission of the first V2X message by means of the first interface.

Further embodiments of the method according to an aspect of the invention are set out by the explanations regarding the embodiments of the communication apparatus according to an aspect of the invention.

According to a further aspect of an aspect of the invention, the communication apparatus according to an aspect of the invention is set up to perform a corresponding method.

In a further development of the indicated communication apparatus, the respective indicated apparatus has at least one memory and at least one processor. The indicated method is saved in the memory in the form of a computer program and the processor is provided to execute the method when the computer program is loaded from the memory into the processor.

According to a further aspect of the invention, a computer program comprises program code means in order to perform all of the steps of one of the indicated methods when the computer program is run on a computer or one of the indicated apparatuses.

According to a further aspect of the invention, a computer program product contains a program code which is stored on a computer-readable data carrier and which, when it is run on a data processing device, performs one of the indicated methods.

Furthermore, an aspect of the invention relates to the use of at least one embodiment of the communication apparatus according to an aspect of the invention in a vehicle or a mobile apparatus such as, for example, a smartphone or a tablet computer.

BRIEF DESCRIPTION OF THE DRAWINGS

Some particularly advantageous configurations of an aspect of the invention are indicated in the subordinate claims. Further preferred embodiments are also set out by the following description of embodiment examples with reference to merely schematically represented figures, wherein:

DETAILED DESCRIPTION OF THE PREFERRED EMBODIMENTS

Figure 1:
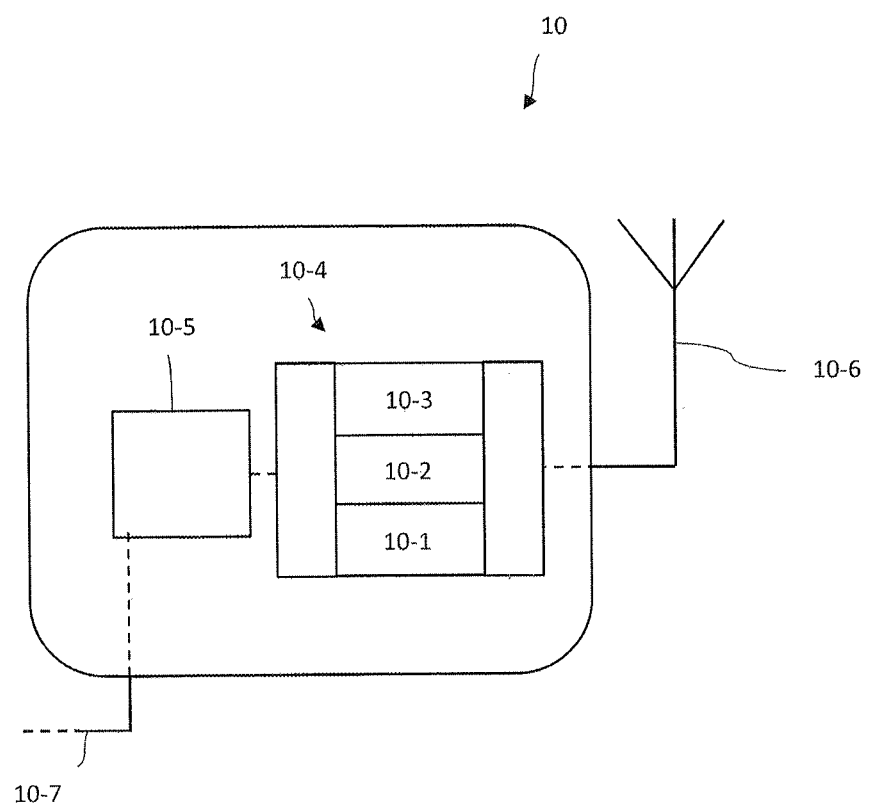
FIG. 1 shows an exemplary embodiment of the communication apparatus according to an aspect of the invention.

FIG. 1 shows an exemplary embodiment of the communication apparatus 10 for vehicle-to-X communication (V2X communication) according town aspect of the invention, comprising a transceiver 10-4 for sending and receiving vehicle-to-X messages by means of an antenna 10-6 via a plurality of communication channels, using a first interface for V2X communication 10-1 via a first communication channel, a second interface 10-2 for V2X communication via a second communication channel and a third interface 10-3 for V2X communication via a third communication channel. Furthermore, the communication apparatus 10 has a computing device 10-5 for processing V2X messages to be sent and received by means of the transceiver 10-4. The communication apparatus 1 is configured, initiated by the transmission of a first V2X message by means of the first interface 10-1, to transmit a second V2X message by means of the second interface 10-2 and a third V2X message by means of the third interface 10-3. Accordingly, triggered by the transmission of a V2X message via the first communication channel, a substantially simultaneous transmission of a V2X message via the second communication channel and a V2X message via the third communication channel is therefore performed. According to the example, the first communication channel is the so-called "control channel" (CCH), the second communication channel is the so-called "service channel 1" (SCH1) and/or respectively the third communication channel is the so-called "service channel 2" (SCH2) of the ITS G5A band (5,875 GHz to 5,905 GHz) in compliance with the specifications in accordance with ETSI TS 102 724 V1.1.1 (2012-10). In accordance with this exemplary embodiment, the "control channel", in addition to transmitting relevant V2X messages to be transmitted, consequently also serves as a basis for the synchronization of "service channel 1" and "service channel 2". By means of a data transmission device 10-7 such as, for example, a data bus, the communication apparatus can be configured to communicate data with at least one further electronic apparatus such as, for example, an electronic control unit in order to control a vehicle.

Figure 2:
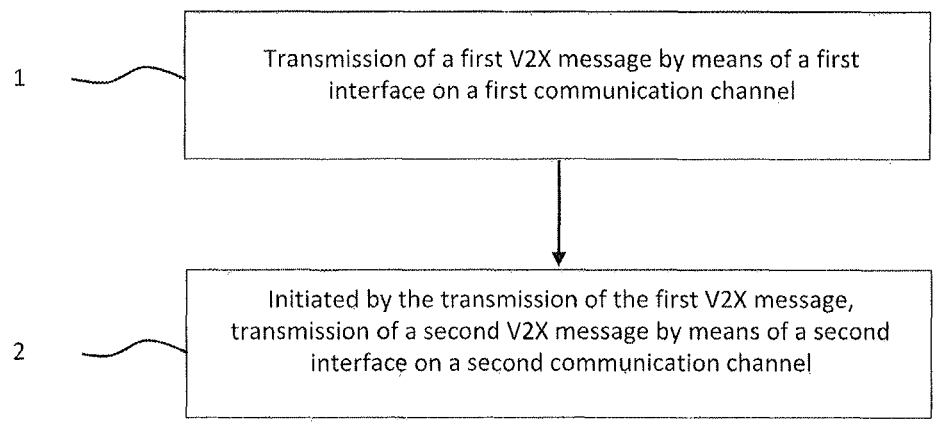
FIG. 2 shows an exemplary embodiment of the method according to an aspect of the invention.

FIG. 2 shows an exemplary embodiment of the method for synchronizing communication channels of a vehicle-to-X communication apparatus according to an aspect of the invention as a temporal flow chart. In a step 1, a first V2X message is transmitted on a first communication channel such as, for example, the "control channel" already indicated, by means of a first interface. In a step 2, initiated by the transmission of the first V2X message by means of the first interface, a second V2X message is in particular transmitted substantially simultaneously by means of a second interface on a second communication channel. With reference to the communication apparatus according to FIG. 1, the transmission of messages via "service channel 1" as well as "service channel 2" would be triggered, on executing this method, by transmitting a message via the "control channel".

Figure 3:
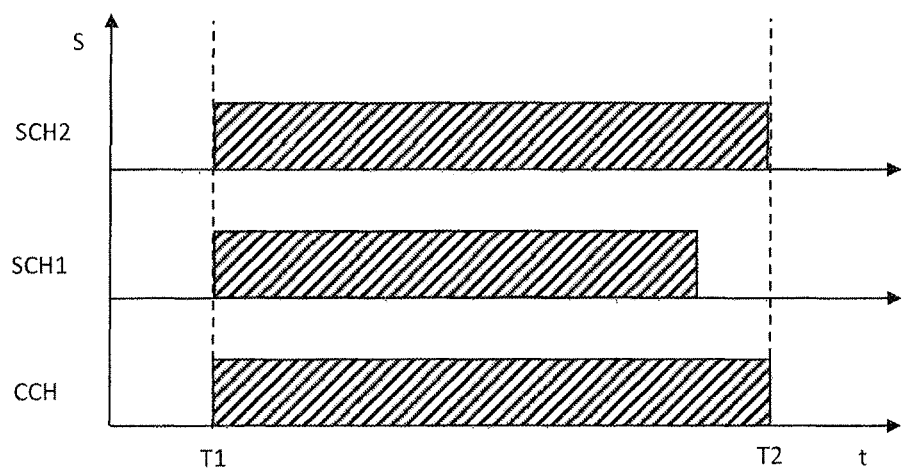
FIG. 3 shows an exemplary timing diagram of a synchronized transmission of V2X messages by an embodiment of the communication apparatus or respectively of the method according to an aspect of the invention.

FIG. 3 shows an exemplary timing diagram of a synchronized transmission of V2X messages by an embodiment of the communication apparatus or respectively of the method according to an aspect of the invention, wherein the signal S of a transmitted V2X message of a respective channel is plotted over time t. By way of example, the communication channels "control channel" CCH, "service channel 1" SCH1 and "service channel 2" SCH2 have been enlisted, as already described. The signals of the V2X messages of the respective channels are illustrated in FIG. 3 by shaded areas. If a first V2X message is transmitted on "control channel" CCH at a start time T1, the V2X messages are likewise transmitted for conveyance via "service channel 1" SCH1 and "service channel 2" SCH2, triggered by said transmission.

As represented, all of the messages are therefore transmitted substantially simultaneously. At an end time T2, the transmission of all of the messages is concluded, wherein the message transmitted on "service channel 1" SCH1 is shorter, according to the example, compared with the others, which is reflected in a shorter transmission duration. In general, it can also be provided within the framework of an aspect of the invention that, after the start time of the transmission of the first message, the end of a predefined period of time is awaited before starting the transmission of at least one of the further messages. Based on the length of time of the transmission of the first message, this also results, due to the overlapping time of the transmissions, in this embodiment, in a substantially simultaneous transmission of all of the messages triggered by the first message.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the attainment of independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4 or 4G or 5G. Vehicle-to-X communication can also be referred to as C2X communication or V2X communication. The sub-areas can be referred to as C2C (Car-to-Car), V2V (Vehicle-to-Vehicle) or C2I (Car-to-Infrastructure) or V2I (Vehicle-to-Infrastructure). An aspect of the invention expressly does not, however, exclude vehicle-to-X communication with the intermediary of, for example, a mobile network and is, as such, to be deemed to be included.

The invention claimed is:

1. A communication apparatus for vehicle-to-X communication (V2X communication), comprising:
a first interface for V2X communication on a first communication channel designated for V2X road safety messages,
a second interface for V2X communication on a second communication channel, and
a computing device for processing V2X messages received and/or to be sent,
wherein the communication apparatus is configured to determine that a first V2X message is to be transmitted by the first interface at a set time determined based on media access control that avoids collisions between the V2X messages, and in response to the determination, and without using media access control that avoids collisions between the V2X messages, trigger transmission of a second V2X message by the second interface at the set time simultaneously with the first V2X message, where the first V2X message is a road safety message that provides synchronization for the start of the transmittal of the second V2X message.

2. The communication apparatus according to claim 1, configured to determine the time of the transmission of the first V2X message by the first interface using a media access control method.

3. The communication apparatus according to claim 1, configured to store V2X messages to be transmitted in a data memory of a transceiver comprised by the communication apparatus.

4. The communication apparatus according to claim 1, configured to store the first V2X message and the second V2X message prior to transmission in a queue assigned in each case to the respective first interface and second interface.

5. The communication apparatus according to claim 3, configured to sign V2X messages to be transmitted prior to storage.

6. The communication apparatus according to claim 1, configured to design the first V2X message to be the same length as or longer than the second V2X message.

7. The communication apparatus according to claim 1, configured to transmit a blank message by means of the first interface after a predefined period of time.

8. The communication apparatus according to claim 1, configured to design at least two channel groups, each having a plurality of communication channels, and to assign V2X messages to be transmitted of similar length and of similar frequency to the same channel group.

9. The communication apparatus according to claim 1, wherein the first communication channel according to ITS-G5 is designed as the specified control channel in this respect and/or according to DSRC as the specified safety channel in this respect.

10. Use of the communication apparatus according to claim 1 in a vehicle or a mobile apparatus.

11. The communication apparatus according to claim 4, configured to sign V2X messages to be transmitted prior to storage.

12. A method for synchronizing communication channels of a vehicle-to-X communication apparatus, comprising:
determining that a first V2X message is to be transmitted by a first interface at a set time determined based on media access control that avoids collisions between the V2X messages on a first communication channel designated for V2X road safety messages; and
in response to the determination, and without using media access control that avoids collisions between the V2X messages, trigger transmission of a second V2X message by a second interface on a second communication channel at the set time simultaneously with the first V2X message, where the first V2X message is a road safety message that provides synchronization for the start of the transmittal of the second V2X message.

* * * * *